United States Patent
Mclean, Jr. et al.

(10) Patent No.: US 10,686,926 B2
(45) Date of Patent: Jun. 16, 2020

(54) MOBILE RECORD-A-CALL DEVICE

(71) Applicants: James Edward Mclean, Jr., Charlotte, NC (US); Edward D. Mclean, San Marcos, TX (US)

(72) Inventors: James Edward Mclean, Jr., Charlotte, NC (US); Edward D. Mclean, San Marcos, TX (US)

(73) Assignee: Mcleanics Technology Corporation, Charlotte, NC (US)

( * ) Notice: Subject to any disclaimer, the term of this patent is extended or adjusted under 35 U.S.C. 154(b) by 0 days.

(21) Appl. No.: 15/530,640

(22) Filed: Feb. 14, 2017

(65) Prior Publication Data
US 2019/0222685 A1 Jul. 18, 2019

(51) Int. Cl.
*H04M 1/656* (2006.01)
*H04W 4/50* (2018.01)
*H04M 1/725* (2006.01)

(52) U.S. Cl.
CPC ............. *H04M 1/656* (2013.01); *H04W 4/50* (2018.02); *H04M 1/72527* (2013.01)

(58) Field of Classification Search
CPC ....... H04W 4/22; H04W 4/005; H04W 4/025; H04W 4/008; H04W 4/02; H04W 4/023; H04M 1/72538; H04M 1/7255; H04M 3/5116
See application file for complete search history.

(56) References Cited

U.S. PATENT DOCUMENTS

| | | | | |
|---|---|---|---|---|
| 2014/0177813 A1* | 6/2014 | Leeds | ..................... | H04M 3/02 379/67.1 |
| 2015/0140954 A1* | 5/2015 | Maier | ..................... | H04W 4/22 455/404.2 |
| 2015/0332532 A1* | 11/2015 | Lee | ..................... | G07C 9/00563 340/5.72 |
| 2015/0371215 A1* | 12/2015 | Zhou | ..................... | G06Q 30/02 705/71 |
| 2016/0335879 A1* | 11/2016 | Carr | ..................... | G08B 25/006 |

* cited by examiner

*Primary Examiner* — Diane D Mizrahi

(57) ABSTRACT

The Mobile Record-A-Call Device (MRACD), is an electronic device, circuit, software program, or App, installed or embedded within, or attached to a mobile communication device such as, but not limited to, a smart phone, cell phone, tablet, laptop, or any other mobile communication device, and enables said mobile communication device to record incoming or outgoing mobile phone calls, and to store said recorded mobile phone calls in a directory or file located within said mobile communication device, or store said recorded mobile phone calls externally in a directory or file located on a platform, server, or network.

3 Claims, 2 Drawing Sheets

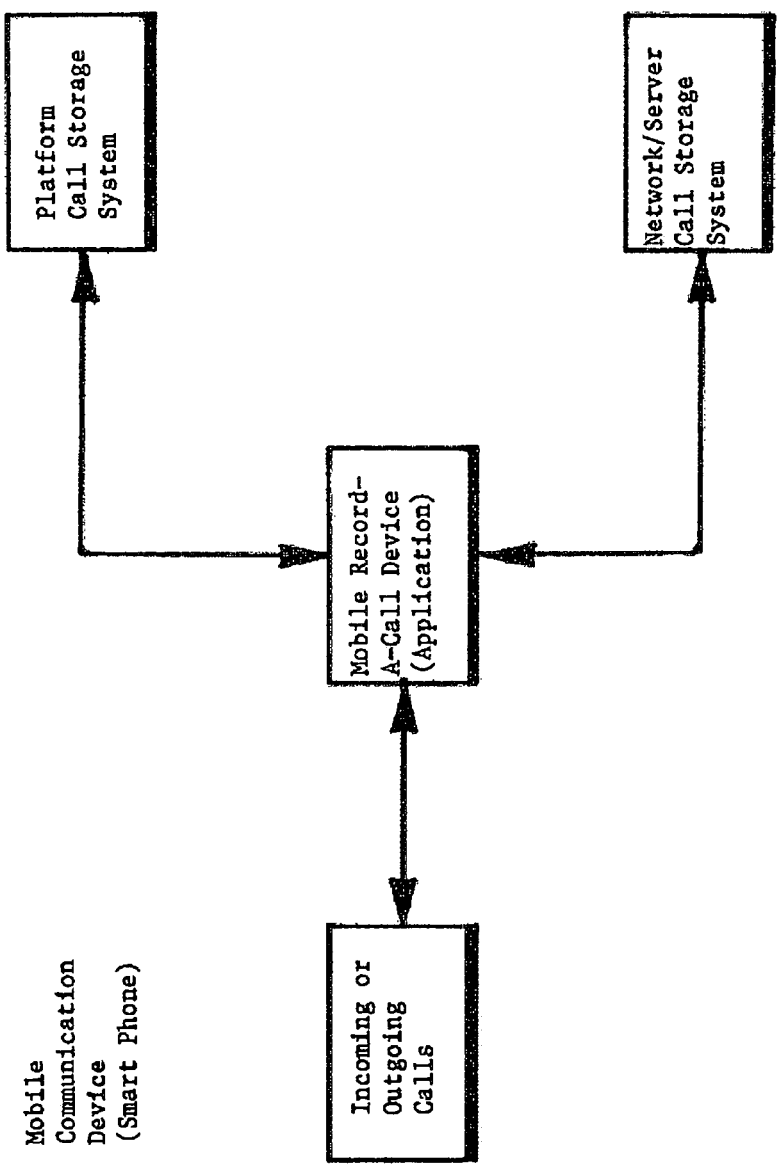

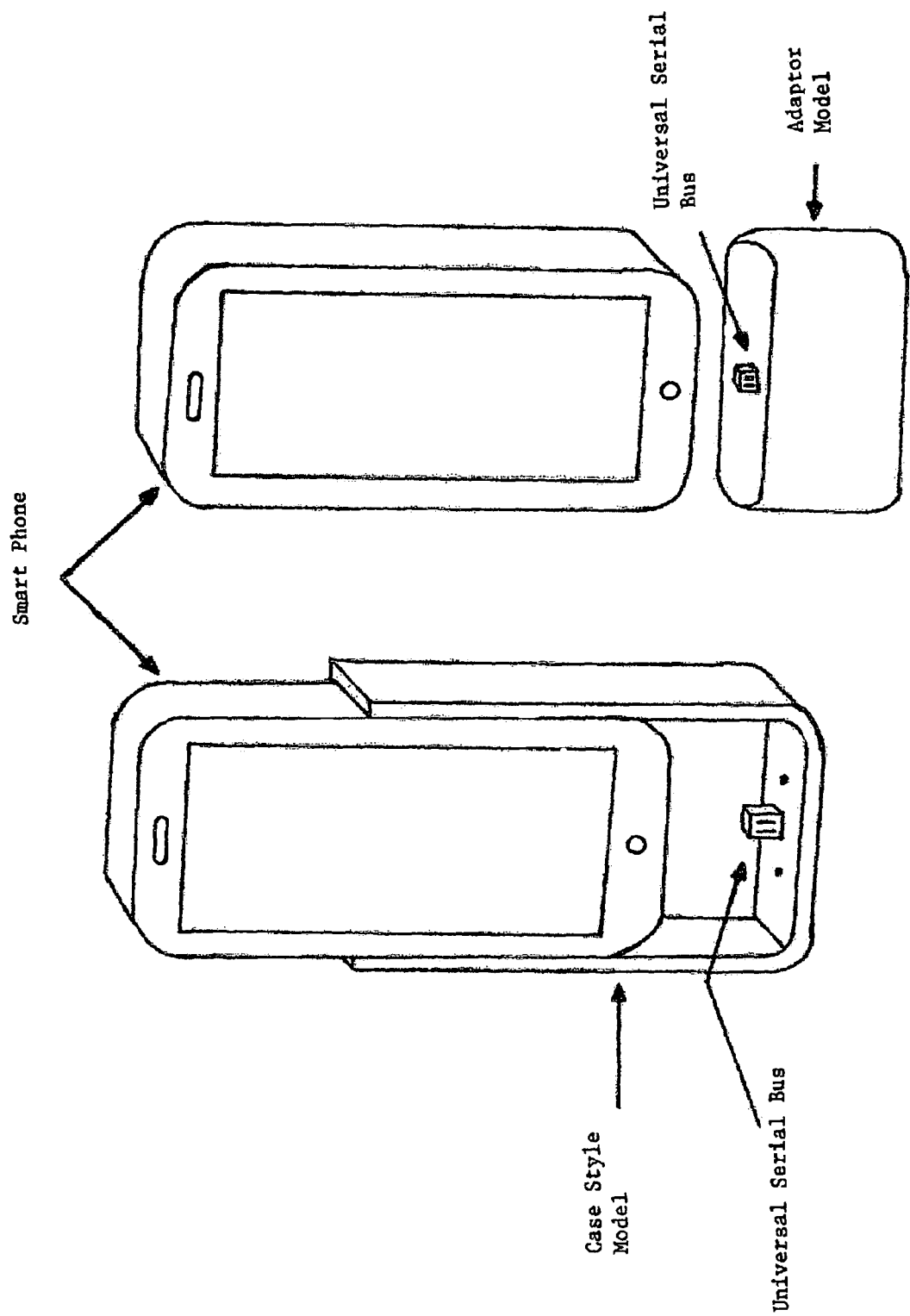

MOBILE RECORD-A-CALL DEVICE

CROSS REFERENCE TO RELATED APPLICATION

This Application is related to the Mobile Record-A-Call Device (MRACD) Provisional Patent Application, Application No. 62/496,752 file on Oct. 28, 2016.

STATEMENT REGARDING FEDERAL SPONSORED RESEARCH

None Applicable.

REFERENCE TO SEQUENCE LISTING, TABLE, OR A COMPUTER PROGRAM LISTING COMPACT DISC APPENDIX

None Applicable.

BACKGROUND OF INVENTION

The Mobile Record-A-Call Device (MRACD), is in the field of mobile communication technology devices, i.e. smart phones, cell phones, tablets, etc.

As of today, the current mobile communication device technology does not allow a user of a mobile communication device to record his/her incoming or outgoing mobile phone call(s). Therefore, the user of the mobile communication device may be in a difficult situation when a need arises to write down certain directions to a location while driving, or take thorough notes of a very important phone call or conference call regarding a business matter while on the go, the MRACD will help to solve such situations.

BRIEF SUMMARY OF INVENTION

The Mobile Record-A-Call Device (MRACD), is an electronic device, circuit, software program, or App, installed or embedded within, or attached to a mobile communication device such as, but not limited to, a smart phone, cell phone, tablet, laptop, or any other mobile communication device, and enables said mobile communication device to record incoming or outgoing mobile phone calls, and to store said mobile phone calls in a directory or file located within said mobile communication device, or store said mobile phone calls externally in a directory or file located on a platform, server, or network.

BRIEF DESCRIPTION OF THE SEVERAL VIEWS OF THE DRAWINGS

FIG. 1, is the Block Diagram View of the Invention. In this figure, the MRACD is shown as an Application (App) installed on a mobile communication device, (i.e. smart phone). Once an incoming mobile phone call is received, or an outgoing mobile phone call is made, the user of the mobile communication device may elect to record said mobile phone call by activating the MRACD. Once the MRACD is activated, the mobile phone call will be recorded and temporarily stored in a directory or file within the mobile communication device. Upon termination of the mobile phone call, the user will have the option to save the recorded mobile phone call on the mobile communication device, or to upload and save said mobile phone call to a platform, network, or server. Once the mobile phone call is saved, the MRACD will enable the user of the mobile communication device to replay or playback said saved recorded mobile phone call.

FIG. 2, is the Connectivity View of the Invention. In this figure, the MRACD is depicted as an electronic device that is attached to a mobile communication device. There are two versions of the MRACD depicted in this figure, the first version being a Case Style Model that connects to the mobile communication device via a USB connector; the second version is an Adaptor Model that also connects to the mobile communication device via a USB connector. Other type of connectors may be used, or a wireless means (i.e. WiFi, Blue Tooth, etc.) may be used as well. Both version types depicted in this figure will also incorporate or provide all of the same feature and functions as described in FIG. 1 above, which are incorporated herein by reference.

DETAILED DESCRIPTION OF THE INVENTION

The Mobile Record-A-Call Device (MRACD), is an electronic device, circuit, software program, or App, installed or embedded within, or attached to a mobile communication device such as, but not limited to, a smart phone, cell phone, tablet, laptop, or any other mobile communication device, and enables said mobile communication device to record incoming or outgoing mobile phone calls, and to store said recorded mobile phone calls in a directory or file located within said mobile communication device, or store said recorded mobile phone calls externally in a directory or file located on a platform, server, or network.

The MRACD may be a circuit that is incorporated or embedded within the circuitry of a mobile communication device such as, but not limited to, a smart phone, cell phone, laptop, tablet, or any other mobile communication devices.

The MRACD may be an electronic device that is attached to a mobile communication device via its USB port, or other connection means; or may be connected to a mobile communication device via a wireless means such as, but not limited to, Blue Tooth, WiFi, or any other wireless means or protocols.

The MRACD may be a software program or App installed within a mobile communication device, or a utility file that is a part of the mobile communication device's operating system.

For purposes herein, a mobile communication device shall include, but is not limited to, a smart phone, cell phone, laptop, tablet, smart watch, mobile computer, wearable communication device, or any other mobile communication device.

Once the MRACD is installed or embedded within, or attached to a mobile communication device, and a mobile phone call is received or initiated on said mobile communication device, the user may record said mobile phone call by pressing an icon or button entitled "Record-A-Call". Once the mobile phone call recording begins, it will continue until the mobile phone call is terminated. After the mobile phone call is terminated, the MRACD will automatically store said recorded mobile phone call within the mobile communication device in a directory or file created during the initiation, of the recording process. The user will be able to view a listing of all recorded mobile phone calls stored in said directory or file, and replay or playback said stored recorded mobile phone calls via the playback feature of the MRACD.

Unlike today's technology for mobile communication devices which do not permit mobile phone call recording, the MRACD will enable a user of a mobile communication device to record a mobile phone call; therefore, eliminating the need for the user to search for a pen and paper, or to balance the mobile communication device between his/her neck and shoulder while attempting to write a message or take notes of a particular subject or issue being communicated by the caller, the MRACD solves this problem by a simple click or touch of a button or icon, which in turn, records the mobile phone call and all of its details.

We claim:

1. An electronic device comprising:
   (a) a recording device, which enables a mobile communication device to record an incoming and outgoing mobile phone call;
   (b) a storage device to store said recorded incoming and outgoing mobile phone calls in a directory a file located within said mobile communication device; storing recorded mobile phone calls externally in a directory, or file located on a platform, server, or network; and enables a user to view a listing of said directory or files;
   (c) an icon or button to enable a user to activate said recording device; and to continue to record said mobile phone call until said mobile phone call is terminated;
   (d) a device to enable a user to replay or playback said stored recorded mobile phone call;
   (e) a Universal Serial Bus or connector for connecting said electronic device to said mobile communication device;
   (f) a wireless protocol for connecting said electronic device to said mobile communication device;
   (g) a connectivity device, wherein said connectivity device is a housing case that incorporates functions and features of said electronic device, and enables said electronic device to cradle said mobile communication device, and to connect a Universal Serial Bus, or connector, and wireless protocol; said connectivity device is an adaptor that incorporates the functions and features of said electronic device, and enables said electronic device to connect to mobile communication device by a Universal Serial Bus, or connector, and wireless protocol; said connectivity device is an electronic circuit that is incorporated or embedded within the circuitry of said mobile communication device, and incorporates the functions and features of said electronic device;
   (h) and a software program or application installed on said mobile communication device to control and instruct the functions and features of said electronic device to generate a recording of an incoming or outgoing call in the adapter model.

2. The electronic device, of claim 1, said electronic device is a mobile communication device programmed with a software program, application, or utility file to generate the functions and features of said electronic device.

3. The electronic device, of claim 1, said storage device is a memory and a data storage directory capacity of said mobile communication device.

* * * * *